(12) United States Patent
Degner et al.

(10) Patent No.: US 9,239,598 B2
(45) Date of Patent: Jan. 19, 2016

(54) THERMAL ARCHITECTURE

(71) Applicant: Apple Inc., Cupertino, CA (US)

(72) Inventors: Brett W. Degner, Menlo Park, CA (US); Douglas L. Heirich, Palo Alto, CA (US); Frank F. Liang, San Jose, CA (US); Jay Nigen, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 529 days.

(21) Appl. No.: 13/629,557

(22) Filed: Sep. 27, 2012

(65) Prior Publication Data
US 2013/0319638 A1 Dec. 5, 2013

Related U.S. Application Data

(60) Provisional application No. 61/653,329, filed on May 30, 2012.

(51) Int. Cl.
| | |
|---|---|
| *G06F 1/20* | (2006.01) |
| *H05K 5/00* | (2006.01) |
| *H05K 7/20* | (2006.01) |
| *F28D 7/02* | (2006.01) |
| *F16L 3/22* | (2006.01) |
| *G06F 1/18* | (2006.01) |
| *F28F 13/00* | (2006.01) |
| *F28D 15/00* | (2006.01) |
| *F28F 7/00* | (2006.01) |
| *F28D 21/00* | (2006.01) |
| *F28D 1/02* | (2006.01) |

(52) U.S. Cl.
CPC .................. *G06F 1/20* (2013.01); *G06F 1/181* (2013.01); *G06F 1/203* (2013.01); *G06F 1/206* (2013.01); *F28D 1/024* (2013.01); *F28D 15/00* (2013.01); *F28D 2021/0028* (2013.01); *F28F 7/00* (2013.01); *F28F 13/00* (2013.01); *F28F 2250/00* (2013.01)

(58) Field of Classification Search
CPC ........... G06F 1/20; G06F 1/203; G06F 1/206; F28F 13/00; F28F 7/00; F28D 15/00
USPC ............. 361/679.49–679.52, 679.54, 679.21, 361/676–678, 679.53, 688–723, 831; 165/104.24; 248/68.1, 122.1
See application file for complete search history.

(56) References Cited

U.S. PATENT DOCUMENTS

| | | | |
|---|---|---|---|
| 5,966,286 | A | 10/1999 | O'Connor et al. |
| 6,043,979 | A * | 3/2000 | Shim .............................. 361/695 |
| 6,434,001 | B1 | 8/2002 | Bhatia |
| 6,522,535 | B1 | 2/2003 | Helot et al. |
| 6,671,172 | B2 * | 12/2003 | Carter et al. .................. 361/697 |
| 6,826,047 | B1 | 11/2004 | Chen et al. |

(Continued)

*Primary Examiner* — Courtney Smith
*Assistant Examiner* — Zhengfu Feng
(74) *Attorney, Agent, or Firm* — Downey Brand LLP

(57) ABSTRACT

The described embodiment relates generally to the field of thermal management. More specifically an apparatus for cooling a unibody computing device with obscured inlet and outlet vents is disclosed. Inlet vents are arranged on a bottom surface of the unibody computing device and then exhaust air is vented out from a rear surface of the computing device. The rear vents can be obscured by a stand designed to support the weight of the computing device. By venting exhaust air to either side of the support stand exhaust air can be prevented from being drawn back into the inlet vents, thereby avoiding an overheating condition.

17 Claims, 7 Drawing Sheets

(56) References Cited

U.S. PATENT DOCUMENTS

| | | |
|---|---|---|
| 6,837,058 B1 | 1/2005 | McEuen et al. |
| 8,000,099 B2 * | 8/2011 | Parker ............... 361/679.48 |
| 2007/0064388 A1 * | 3/2007 | Uchizono et al. ............ 361/690 |
| 2011/0310557 A1 * | 12/2011 | Ooe ............................ 361/692 |

* cited by examiner

THERMAL ARCHITECTURE

BACKGROUND

1. Technical Field

The described embodiment relates generally to an apparatus for cooling a computing device. More specifically the described embodiment discloses an apparatus which can remove heat through hidden inlet and exhaust vents.

2. Related Art

Most computing devices generate enough heat to require some form of active cooling process in order to dissipate the heat and prevent overheating conditions in the device. One way devices are kept cool is by circulating air into and out of computing device enclosures. Circulation of air generally requires at least two holes or apertures to be situated somewhere along the surface of the computing device enclosure. Such holes or apertures are typically referred to as vents and at least two are needed so that air can come in one vent and exit through another. Generally, a device would include a series of inlet vents and a series of outlet vents. Unfortunately, these arrays of vents can mar the overall look and appearance of the computing device enclosure.

Therefore, what is desired is a concealed vent configuration that allows an accompanying heat removal system to rejects enough heat to keep the computing device from overheating.

SUMMARY

This paper describes many embodiments that relate to systems, and a method for obscuring a heat rejection system disposed inside a unibody computing device.

In a first embodiment a heat rejection subsystem for a computing device having a unibody enclosure which holds both a display and a number of electronic components is disclosed. The computing device includes at least the following: (1) a unibody enclosure; (2) a stand mechanically coupled to a rear surface of the unibody enclosure; (3) at least one inlet vent arranged along a lower edge of the unibody enclosure; (4) at least one outlet vent arranged below the stand's mechanical coupling point to the unibody enclosure, the outlet vent substantially concealed by the stand; (5) a fan assembly, the fan assembly including at least an air intake configured to draw air through the at least one inlet vent and across the plurality of electronic components, and an air outlet duct; and (6) a fin stack disposed just inside the at least one flat outlet vent, having curved fins arranged to divert a flow of exhaust air around the stand as the exhaust air exits the computing device. The at least one flat outlet vent prevents the exhaust air from traveling towards and being reabsorbed by the at least one inlet vent.

In another embodiment a method for cooling a unibody device enclosure is disclosed. The method includes at least the following steps: (1) activating a cooling component when a defined temperature threshold is exceeded; (3) drawing a volume of air into the unibody device enclosure through a number of inlet vents; (4) circulating the air through the unibody device enclosure; (5) expelling the air from the unibody device enclosure across a number of cooling fins; (6) shaping the air exiting the unibody device enclosure by a number of curved cooling fins and by a number of flat exhaust vents. The plurality of inlet vents are concealed along a lower edge portion of the unibody electronic device and the plurality of outlet vents are obscured from direct view by a stand mechanically supporting the unibody device enclosure.

In yet another embodiment a heat rejection system is disclosed. The heat rejection system includes at least the following: (1) a stand mechanically coupled to a rear surface of a unibody computing device housing; (2) a plurality of intake vents arranged along a bottom edge of the unibody computing device housing; (3) a plurality of outlet vents arranged on the rear surface of the unibody computing device housing, wherein the plurality of outlet vents are obscured from direct view by the stand; (4) a fan disposed within an upper central portion of the unibody computing device housing; and (5) a diverter disposed between the fan and the plurality of outlet vents. The fan is configured to draw air in through the plurality of intake vents which circulates through the unibody computing device in a circular pattern. The diverter separates the air into two separate streams such that each stream of air is directed around the stand.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF EXAMPLE EMBODIMENTS

Figure 1:
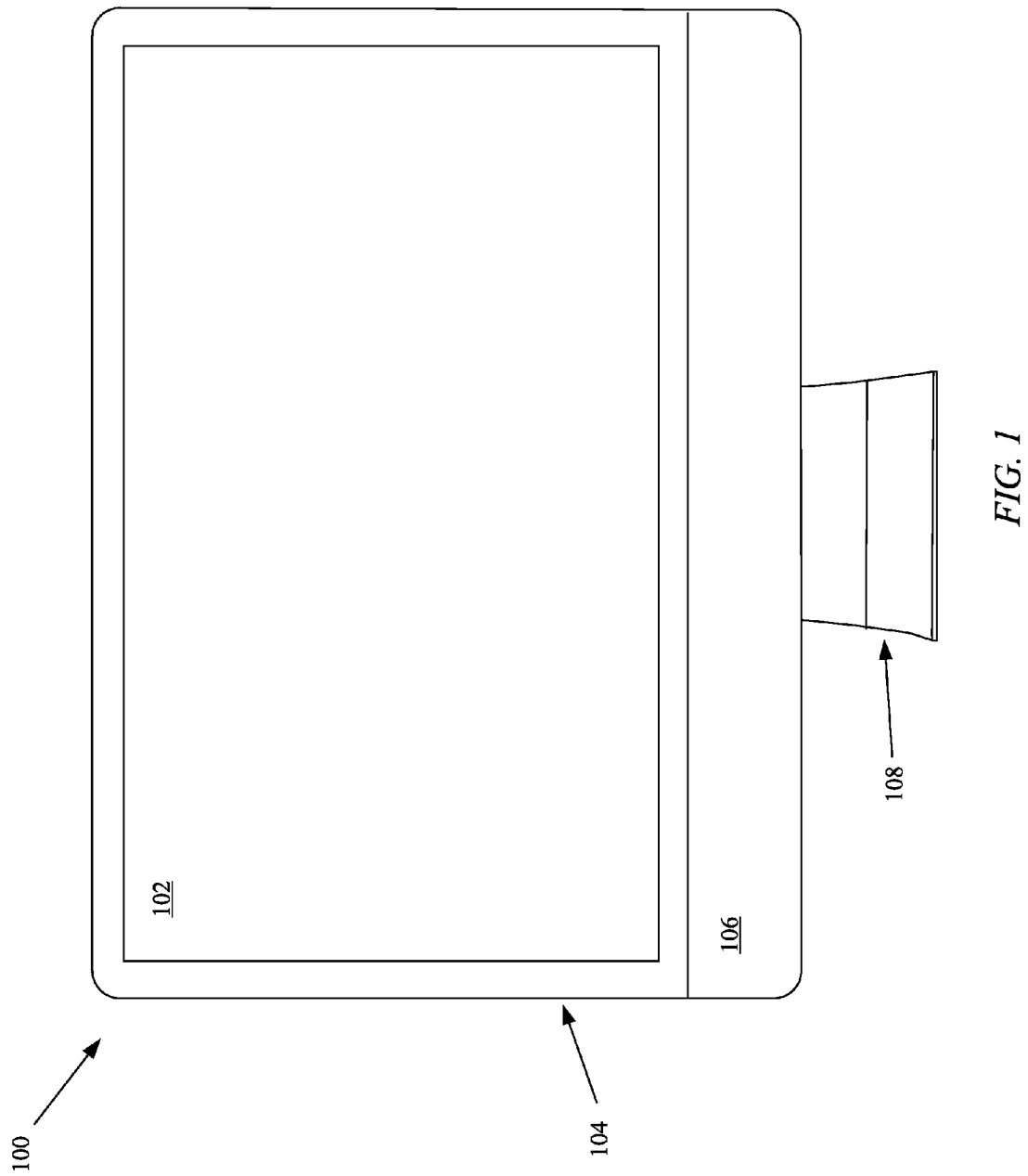
FIG. 1 illustrates a front view of computing device 100 in accordance with the described embodiment.

A representative apparatus and application of methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

As electronic devices are made increasingly smaller, solutions for heating such electronic devices require greater creativity and thought. One way in which device size can be reduced is to taper the edges of an electronic device housing. Unfortunately such tapering of an electronic device leaves significantly less vertical space in the electronic device's enclosure for cooling components. One way to maximize heat removal performance is to position the cooling devices in the central portion of the electronic device enclosure, leaving sufficient space for a large blower, the exhaust of which can be coupled to a cooling fin stack. In many of the described embodiments a single blower is disposed just above the center of the electronic device enclosure. This allows the use of cooling components with significantly greater height than would be possible if positioned in the tapered peripheral portions of the described electronic device housing. Since a single blower and fin stack are employed in cooling the electronic device, heat pipes from a central processing unit (CPU) and a graphics processing unit (GPU) are both attached to the same fin stack. A fin stack sized only for a GPU or CPU would generally have more limited heat removal capacity than the shared fin stack employed by the described embodiment. Consequently, the CPU and GPU enjoy full air flow and fin area regardless of symmetric or asymmetric loading. For example, in video rendering tasks the CPU is generally more highly utilized than the GPU. The CPU can then benefit from the entire heat removal system sized for both chips, allowing it to operate at higher speeds for longer periods than a CPU with a smaller fin stack and blower. Furthermore, oversized cooling components can allow for overclocking of certain components when only one of the CPU and GPU are in active use.

The centralized location of cooling components also beneficially allows a short air conduit to direct heated cooling air out a rear surface of the electronic device housing. Locating the exhaust vents in the rear surface of the electronic device has the following advantages: (1) the exhaust vents can be positioned in a location in which they are concealed behind a stand designed to support the electronic device; and (2) the heated cooling air can be directed to either side of the stand preventing heated air from being reflected back at a user or back into the intake vents of the electronic device housing. Furthermore, regardless of the orientation of the electronic device, the vented exhaust is optimally directed away from the user while that user is in a position to interact with the electronic device.

This embodiment and other embodiments are discussed below with reference to FIGS. 1-7; however, those skilled in the art will readily appreciate that the detailed description given herein with respect to these figures is for explanatory purposes only and should not be construed as limiting.

FIG. 1 illustrates a front view of unibody computing device 100. Unibody computing device 100 contains a display portion 102. Display portion 102 can be made from any modern display technology such as liquid crystal display (LCD, or organic light emitting diode (OLED) technology. Display portion 102 is covered and protected by display cover 104 which can be made of any thin translucent material such as glass or hardened plastic. As shown display cover 104 can extend past the edges of display portion 102, giving the top portion of computing device 100 a uniform appearance. Enclosure 106 encases display portion 102 and includes mounting means for attaching display cover 104. Enclosure 106 can be made of any rigid material sturdy enough to support electronic components for driving display portion 102 and for carrying out computing operations. Enclosure 106 is supported by stand 108. Stand 108 can be rotatably connected to enclosure 106, allowing enclosure 106 to rotate at least up and down. In some embodiments stand 108 can be configured to allow the vertical position of enclosure 106 to be adjusted up and down. In yet other embodiments stand 108 can enable left and right rotation of enclosure 106.

Figure 2:
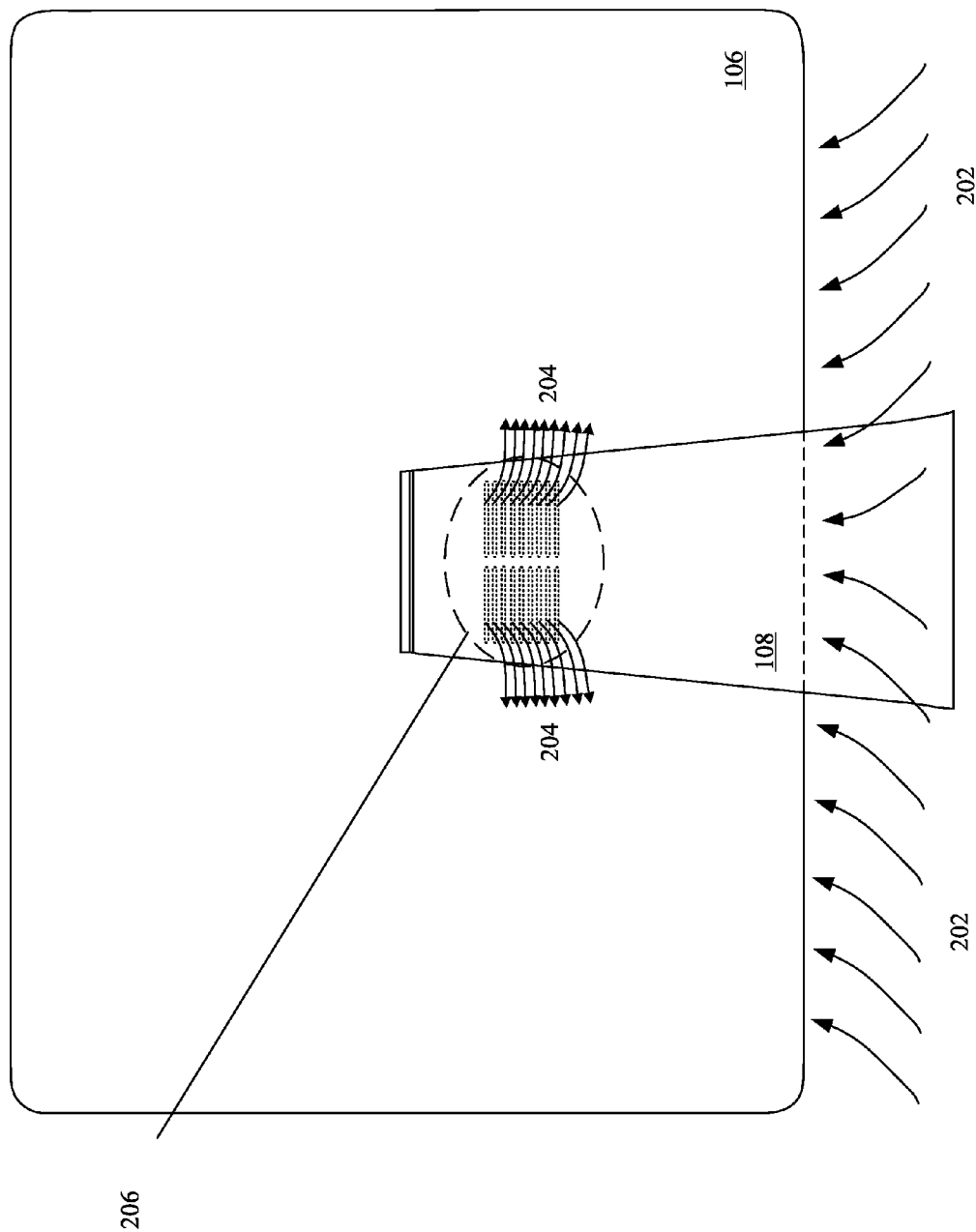
FIG. 2 illustrates a rear view of computing device 100 showing how air is drawn in and exhausted in accordance with the described embodiment.

FIG. 2 illustrates a rear view of unibody computing device 100. Unibody computing device 100 has inlet cooling vents (not shown) arranged along a bottom surface of enclosure 106. The inlet cooling vents allow cool air flow 202 to enter enclosure 106 replacing air that has been heated by computing components located inside enclosure 106. Heated air 204 is expelled from enclosure 106 through outlet cooling vents 206. Outlet cooling vents 206 are cut into the rear of enclosure 106 at a flat angle. This flat angle keeps air from having a downward velocity component as it exits enclosure 106. Behind outlet cooling vents 206 are cooling fin vents which can impart a horizontal component to heated air 204 as it exits enclosure 106. The combination of flat outlet cooling vents 206 and interior, horizontally pointing cooling fin vents allows heated air 204 to escape enclosure 106 without being reflected downwards by stand 108, thereby preventing heated air 204 from being recycled into the inlet cooling vents located at the bottom surface of enclosure 106. This configuration also pays great dividends in overall aesthetics of the device. Since the inlet vents are arranged along the bottom of enclosure 106 they are well concealed and out of sight. Furthermore, positioning outlet cooling vents 206 behind stand 108 effectively conceals outlet cooling vents 206 from sight.

Figure 3:
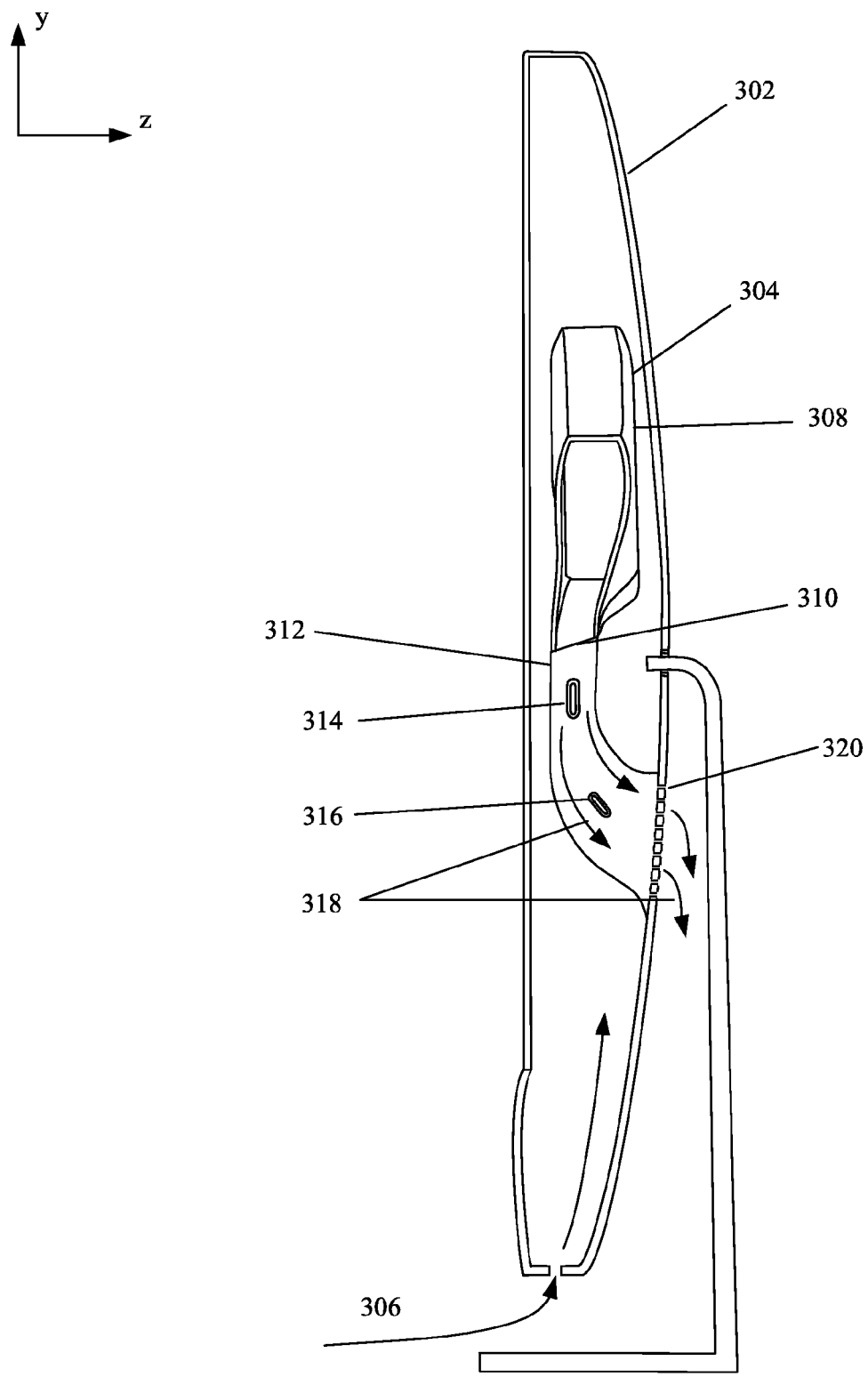
FIG. 3 illustrates a cross-sectional side view of one embodiment of computing device 100.

FIG. 3 illustrates a cross-sectional side view of one embodiment of computing device 100. This cross-sectional view more clearly illustrates the air flowing into and out of enclosure 302. Blower 304 is the component that is responsible for drawing air into and expelling air out of enclosure 302. Blower 304 is arranged just above the thickest portion of enclosure 302 thereby nearly maximizing the amount of room in the Z direction for fan blades enclosed in blower 304. Because blower 304 is located towards the upper portion of enclosure 302, cooling air flow 306 gets drawn from a bottom to an upper portion of enclosure 302, thereby allowing air to circulate throughout enclosure 302. In one embodiment, as illustrated blower 304 can be a centrifugal fan sucking air into blower inlet 308 and expelling air out of blower outlet 310. Blower outlet 310 can be mechanically coupled to air conduit 312 which houses cooling fins (not shown) and heat pipes 314 and 316. Heat pipes 314 and 316 can be conductively coupled to the cooling fins arranged in air conduit 312. In this way as cooling air flow 306 is expelled from blower outlet 310 through air conduit 312, cooling air flow 306 removes heat from the cooling fins which have been conductively heated by heat pipes 314 and 316. In the illustrated embodiment heat pipe 314 can be attached to a central processing unit (CPU) and heat pipe 316 can be attached to a graphics processing unit (GPU). Air conduit 312 directs heated air 318 directly from blower outlet 310 to outlet cooling vents 320. As heated air 318 passes over the cooling fins, heat pipe 314 and 316 it provides cooling for the CPU and GPU. In this case heat pipe 314 is arranged prior to heat pipe 316 as the CPU typically requires more cooling than the GPU; however, in some configurations a high performance GPU can be installed in which case heat pipe 316 can be placed first in conduit 312. As heat loading increases blower 304 can operate at higher speeds to accelerate heated air 318 more quickly across the cooling fins and heat pipes arranged in air conduit 312, thereby increasing heat removal rates.

Figure 4:
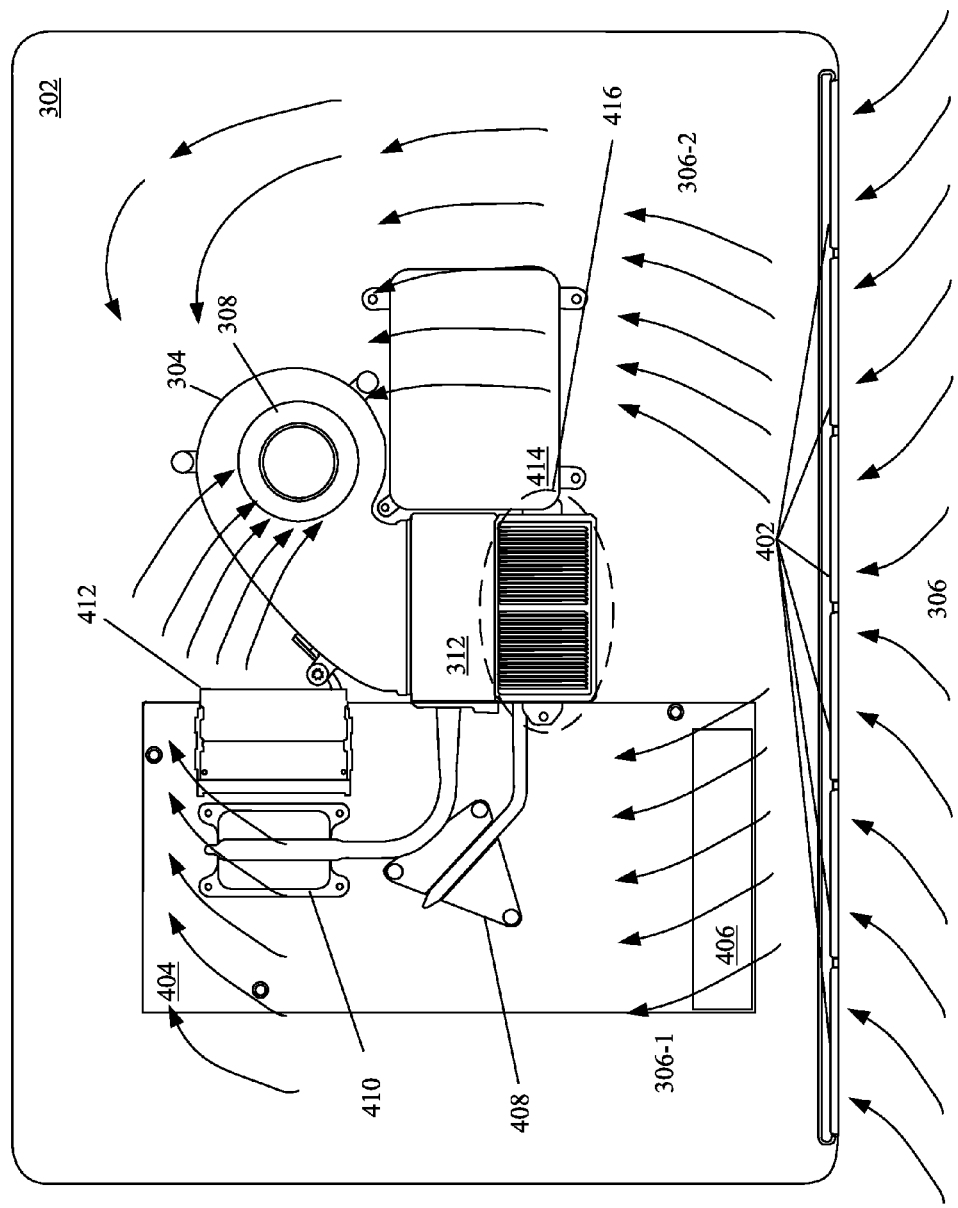
FIG. 4 illustrates a rear cross-sectional view of the embodiment illustrated in FIG. 3, demonstrating how air is directed across operational components.

FIG. 4 illustrates a rear cross-sectional view of the embodiment illustrated in FIG. 3. A number of inlet vents 402 are shown along the bottom surface of enclosure 302. Inlet vents 402 allow cooling air flow 306 to be sucked into enclosure 302 by blower 304. As cooling air flow 306 enters enclosure 302 it is split into two pathways which flow to either side of blower 304 and air conduit 312. Cool air flow portion 306-1 flows across main logic board 404 which includes inlet outlet port array 406, GPU 408, CPU 410 and finally random access memory modules 412; subsequently, cooling air flow portion 306-1 is sucked into blower 304, through blower inlet 308. Right cooling air flow portion 306-2 flows to the right side of enclosure 302 passively cooling hard drive 414 and other nearby components prior to entering blower inlet 308. This configuration as depicted allows cool air flow 306 to flow in a circular pattern around enclosure 302, effectively preventing stagnation of hot air inside enclosure 302. This particular figure also illustrates the position of outlet cooling fins 416. As depicted half of outlet cooling fins 416 direct air leftward and the other half of outlet cooling fins 416 direct air rightward, thereby allowing hot air to avoid hitting the stand supporting enclosure 302. It should be noted that while cooling air flow 306 is not depicted as traversing the entire case the air flow does circulate through the entire case, especially when blower 304 is operating at full capacity.

Figure 5:
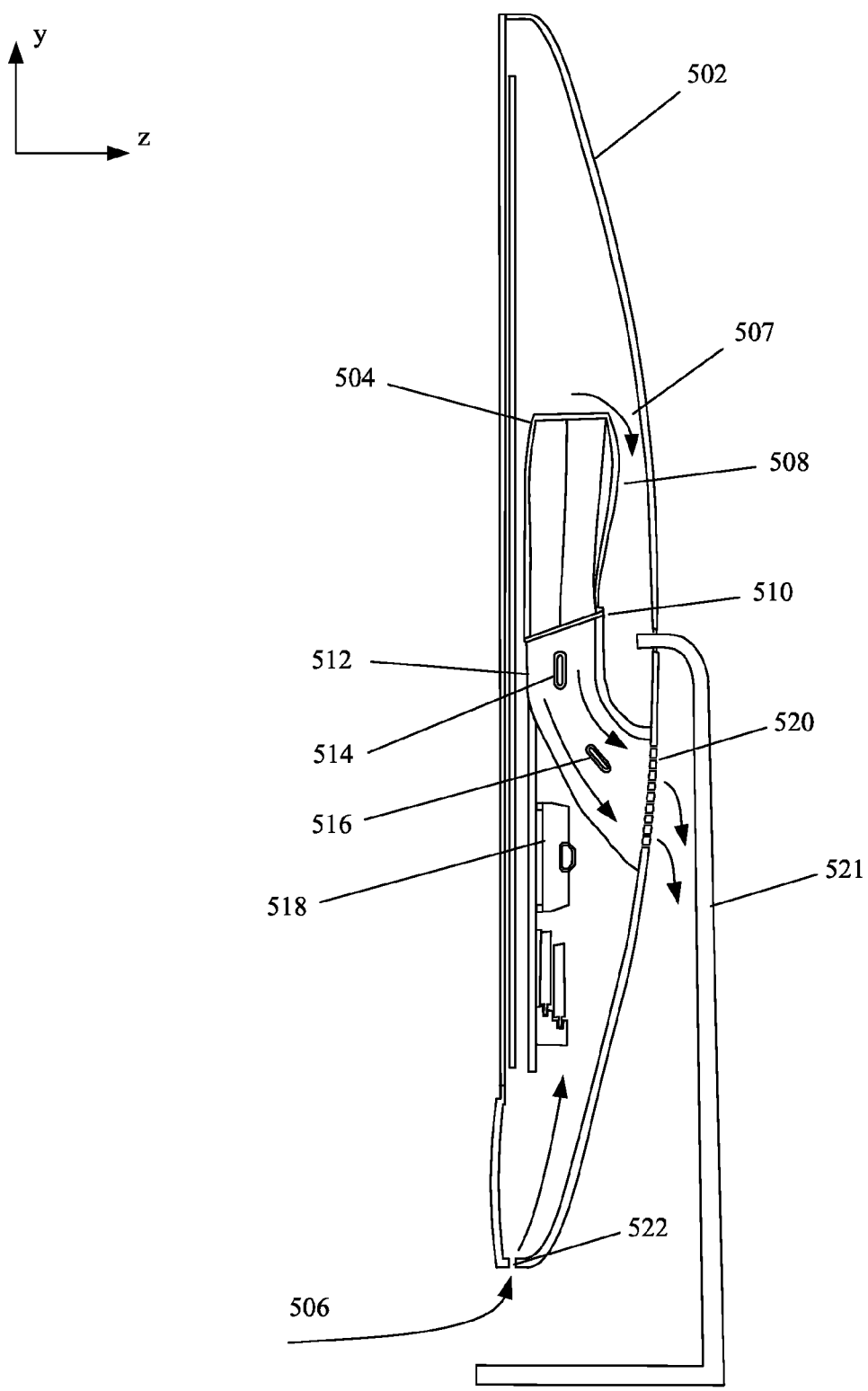
FIG. 5 illustrates a cross-sectional side view of another embodiment of computing device 100.

FIG. 5 illustrates a cross-sectional side view of another embodiment of computing device 100. This embodiment is larger than the embodiment described in FIGS. 3-4, in order to make room for a larger display screen. This embodiment has a vent configuration similar to the configuration depicted in FIG. 2. Enclosure 502 has blower 504 which is responsible for drawing air into and expelling air out of enclosure 502. Similarly to the computing device depicted in FIG. 3, blower 504 is arranged just above the thickest portion of enclosure 502 thereby nearly maximizing the amount of room in the Z direction for fan blades enclosed in blower 504. While the elevated position of blower 504 does prevent full maximization of the blower size, the higher location influence cooling air flow 506 to travel higher up into enclosure 502 before being sucked into blower 504. In some embodiments the shape of a blower enclosure for blower 304 can be tapered to ease pressure build up by enlarging air pathway 507 to blower inlet 508. Blower outlet 510 can be mechanically coupled to air conduit 512 which is configured with cooling fins (not shown) which are conductively coupled to heat pipes 514 and 516. In the illustrated embodiment heat pipe 514 can remove heat from a graphics processing unit (GPU) and heat pipe 516 can remove heat from central processing unit (CPU) 518. Air conduit 512 directs cooling air flow 506 directly from blower outlet 510 to outlet cooling vents 520. As explained in FIG. 2 exhausted cooling air flow 506 can avoid hitting stand 521. As cooling air flow 506 passes over the cooling fins, heat pipe 514 and 516 can provide cooling for CPU 518 and the GPU. In this case heat pipe 514 is arranged in air conduit 512 prior to heat pipe 516. In this embodiment since CPU 518 is arranged right in front of the cooling air inlets 522 it can be attached to a heat pipe situated later in air conduit 512 since it receives an increased amount of cooling air from cooling air inlets 522. Heat pipe 516 also benefits from its position in enclosure 502 since cooled working fluid in heat pipe 516 is gravity fed back to CPU 518 after it is cooled inside air conduit 512. As heat loading increases blower 504 can operate at higher speeds to accelerate cooling air flow 506 more quickly across the cooling fins and heat pipes arranged in air conduit 312.

Figure 6:
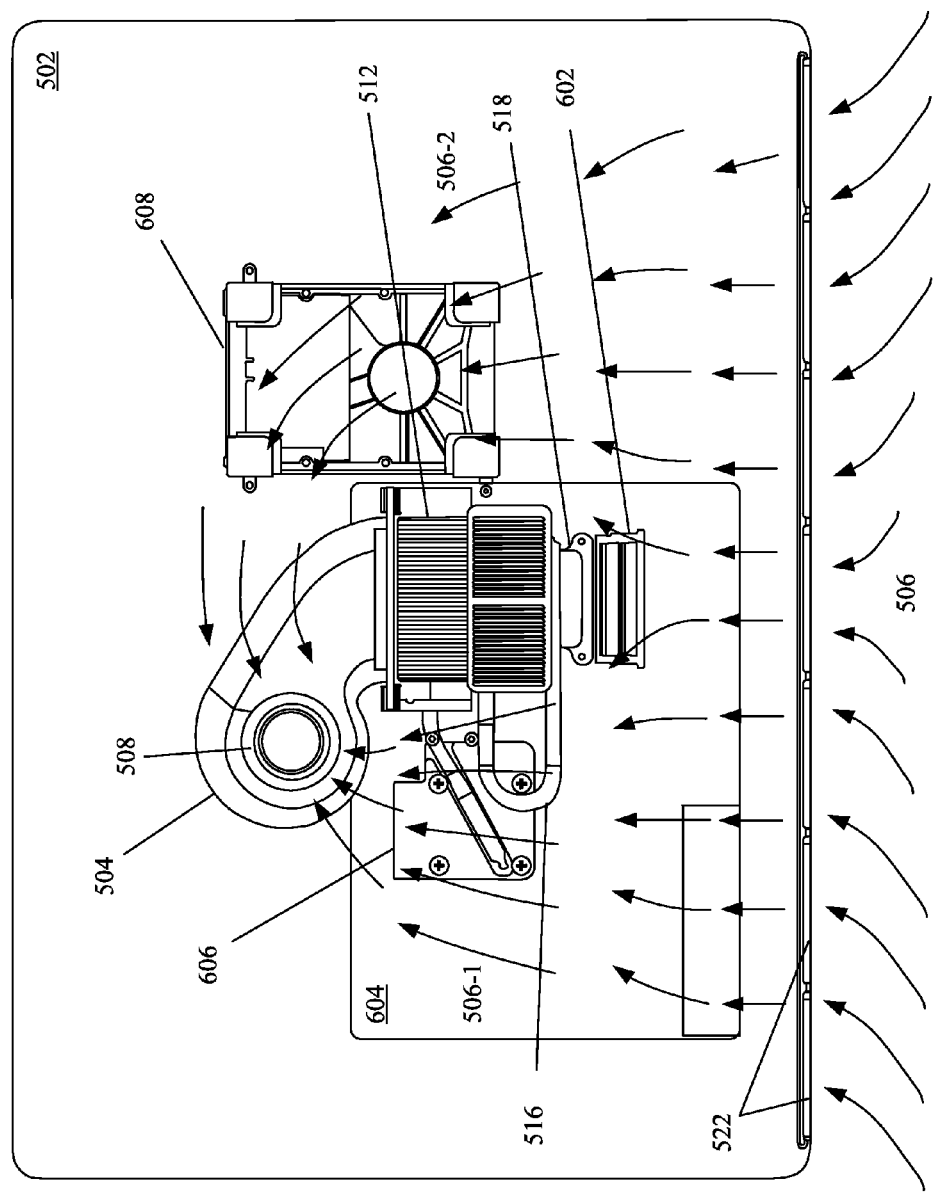
FIG. 6 illustrates a rear cross-sectional view of the embodiment illustrated in FIG. 5, demonstrating how air is directed across operational components.

FIG. 6 illustrates a rear cross-sectional view of the computing device illustrated in FIG. 5. Cooling air flow 506 enters enclosure 502 through a number of cooling air vents 522. Cooling air flow 506 in this embodiment is allowed to flow over flash memory 602 and CPU 518 before being split into two separate air flows by air conduit 512. Once split into two distinct cooling air flows 506-1 and 506-2, left cooling air flow 506-1 flows over main logic board 604 and GPU 606 on its path to blower inlet 508, while right cooling air flow 506-2 is directed across hard drive 608. In this way air can be circulated through enclosure 502 in a circular pattern centered on air conduit 512. The depicted air flow can be demonstrative of air flow under light loading conditions. As more air is sucked into enclosure 502 at a more rapid pace the circumference of cooling air flow 506 can increase resulting in increased air flow throughout enclosure 502. By locating CPU 518 and GPU 606 below their terminating points in air conduit 512 working fluid return for heat pipes 516 and 514 can be gravity fed resulting in greater efficiency of heat pipes 516 and 514 when compared to a flat configuration or a heat pipe configuration where a wicking component of heat pipes 514 and 516 are not assisted by gravity. It should be noted that hot air stagnation in a top portion of enclosure 502 can be prevented by blower 504 which in addition to sucking air up through cooling air vents 522 also functions to circulate cooling air through upper portions of enclosure 502. In this way excessive heating can be prevented from occurring by regularly refreshing air in enclosure 502 with cooling air flow 506. It should be noted that by grouping electrical components which emit a substantial amount of heat close to blower 504, these electrical components can have more space to passively distribute heat into the air, and additionally can have larger volumes of air passing over centrally located electrical components due to their proximity to blower inlet 508.

Figure 7:
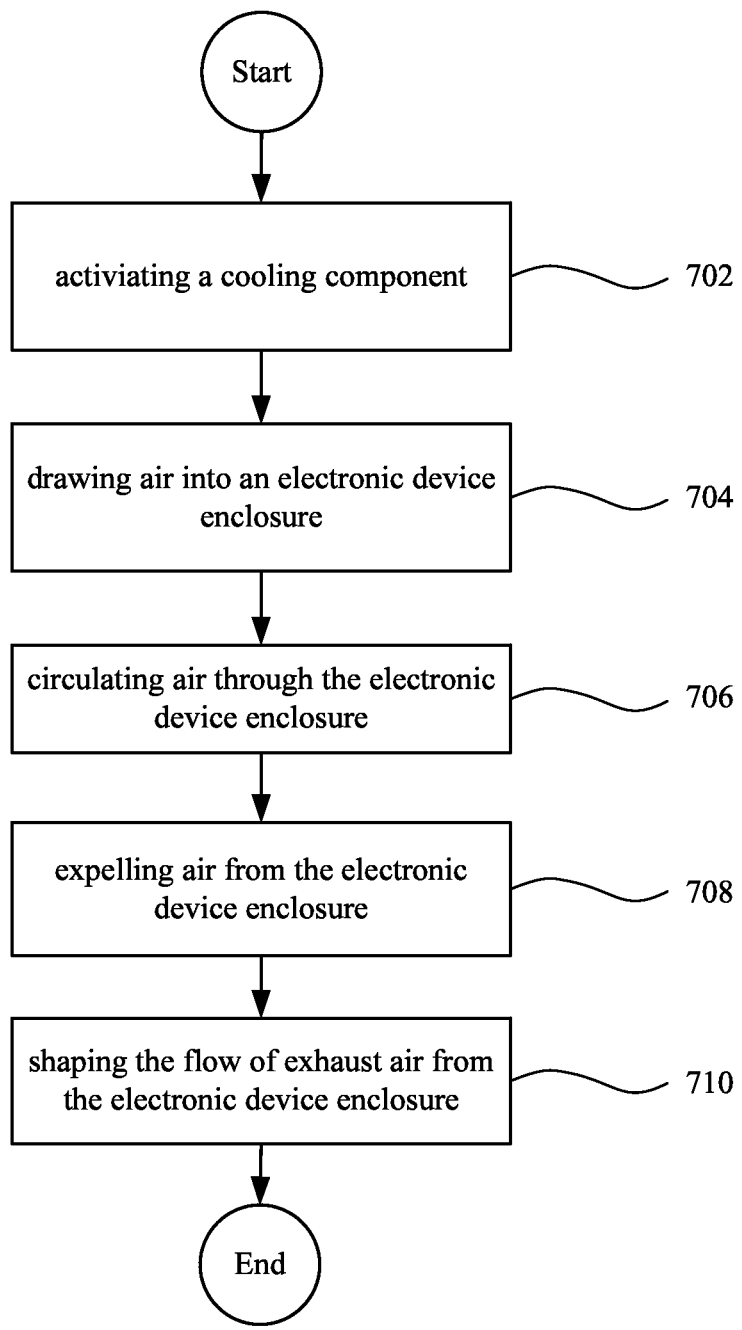
FIG. 7 shows a block diagram of a process 700 for removing heat from an electronic device.

FIG. 7 shows a block diagram of a process 700 for removing heat from an electronic device. In a first step 702 a cooling component is activated when a temperature threshold is exceeded. The electronic device can be configured with numerous temperature sensors designed to monitor components within the electronic device that are susceptible to overheating conditions. In step 704 air can be drawn into the electronic device through at least one inlet vent. The inlet vent can be disposed on a lower edge of the electronic device. In this way inlet vent can be hidden from casual view in such a way that it doesn't aesthetically mar the electronic device. In step 706 once the air is drawn into the enclosure position of the cooling component can influence the air to circulate throughout the device enclosure in a circular pattern. In one embodiment the cooling component can be a fan or blower configured to move large volumes of air while the electronic device is performing demanding tasks. In some embodiments the fan can be a centrifugal fan. The position of the fan in an upper central portion of the enclosure causes the air to split into two streams and then reconverge towards a top portion of the enclosure, thereby efficiently circulating air through the case with only a single fan. In step 708 after the air is sucked into the fan an air duct configured with cooling fins directs air out of the enclosure. The cooling fans are in thermal contact with a series of heat pipes. The heat pipes are configured to remove heat from components within the device that emit a high amount of heat, such as for example integrated circuits. Each integrated circuit can be in thermal contact with a different portion of cooling fins arranged within the duct. Since heat pipe configured integrated circuits are all thermally coupled to one duct asymmetric heating conditions can be more easily handled since the fan is sized to handle large heat loads from a number of integrated circuits simultaneously. In this way one integrated circuit can be driven past normal thermal emission limits when operated on its own. In step 710 the exhaust air reaches the end of the duct and is expelled through at least one exhaust vent. The cooling fins adjacent to the exhaust vent can be curved so that the exhaust air is directed to either side of a mechanical support stand holding the electronic device up. The exhaust vents themselves can be flat horizontally aligned vents configured to flatten a flow characteristic of the exhaust air. In this way a vertical component can be removed from the exhaust air further reducing the likelihood of reintroducing heated air into an inlet vent of the device enclosure.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing device including a heat rejection subsystem for the computing device and a unibody enclosure having an interior surface that defines a cavity suitable for accommodating plurality of electronic components, the computing device comprising:
   a stand rotatably coupled with the unibody enclosure at a coupling point located on a rear exterior surface of the unibody enclosure;
   an inlet vent arranged along a lower edge of the unibody enclosure, the inlet vent allowing air into the cavity to cool the plurality of electronic components;
   an outlet vent arranged along the rear exterior surface, wherein the outlet vent is concealed by the stand, and wherein the outlet vent directs the air exiting the unibody enclosure in a direction substantially parallel to the rear exterior surface and away from the stand; and
   a fin stack disposed within the outlet vent, the fin stack having curved fins that divert the air exiting the unibody enclosure to extend around the stand, wherein the fin stack is connected to a plurality of heat pipes responsible for transferring heat from a plurality of integrated circuits disposed within the unibody enclosure to the fin stack.

2. The computing device as recited in claim 1, wherein the plurality of integrated circuits comprises: a graphics processing unit and a central processing unit.

3. The computing device as recited in claim 1, wherein the fan assembly further comprises:
   a temperature sensor that detects a temperature of at least one point within the unibody enclosure; and
   a fan that adjusts a rate at which air is pulled into the unibody enclosure, commensurate with at least one temperature detected by the temperature sensor.

4. The computing device as recited in claim 3, wherein the fan is positioned in a central portion of the unibody enclosure.

5. The computing device as recited in claim 4, wherein the outlet vent and the curved fins combine to prevent the air from reabsorption by the inlet vent.

6. The computing device as recited in claim 5, wherein the resulting air stream passes through the unibody enclosure in a circular pattern, thereby passing over and convectively cooling substantially all of the plurality of electronic components within the unibody enclosure.

7. The computing device as recited in claim 6, wherein the one outlet vent is a plurality of outlet vents having a flat, horizontal orientation configured to remove a vertical component of the air thereby further reducing a likelihood of the air being sucked back into the unibody enclosure.

8. The computing device as recited in claim 7, wherein electrical components emitting a substantial amount of heat are grouped in a central portion of the unibody enclosure thereby increasing a volume of cooling air passing above them.

9. A method for cooling a unibody device enclosure, the method comprising:
   drawing air into the unibody device enclosure through a plurality of inlet vents disposed on a rear exterior surface of the unibody device enclosure and on a bottom surface of the unibody device enclosure separate from the rear exterior surface;
   circulating the air through the unibody device enclosure comprising circulating the air in a circular pattern throughout the unibody device enclosure comprising an upper portion and a central portion that is below the upper portion; and
   expelling the air through a plurality of outlet vents located at the central portion of the unibody device enclosure, the plurality of outlet vents are hidden from view by a stand used to support the unibody device enclosure, wherein the air expelled through the plurality of outlet vents extends in a direction substantially parallel the rear exterior surface and away from the stand.

10. The method as recited in claim 9, further comprising:
    modulating the circulation pattern by changing operating parameters of the fan commensurate with an amount of heat that needs to be removed from the unibody device enclosure.

11. The method as recited in claim 10, wherein extending the air from the unibody device enclosure across the plurality of cooling fins comprises shaping the air exiting the unibody device enclosure by the plurality of curved cooling fins, and wherein the plurality of outlet vents flattens the flow of air exiting the unibody device enclosure and the plurality of curved cooling fins directs the flow of air around the stand.

12. The method as recited in claim 11, wherein the cooling fins are thermally coupled to a plurality of heat pipes in thermal contact with a plurality of integrated circuits.

13. A heat rejection system for a computing device housing, comprising:
    a plurality of intake vents arranged along a bottom surface of the computing device housing;
    a plurality of outlet vents arranged on a rear surface of the computing device housing, wherein the plurality of outlet vents are obscured from direct view by a stand coupled with the rear surface;

a fan disposed within computing device housing; and a diverter disposed between the fan and the plurality of outlet vents, wherein the fan draws air in through the plurality of intake vents to circulate the air throughout the computing device housing, wherein the air circulated throughout the computing device housing includes a circular pattern and wherein the diverter separates the air into two separate streams such that each stream of air is directed around the stand.

14. The heat rejection system as recited in claim 13, wherein the diverter comprises:

an air duct directing air flow from the fan to the plurality of outlet vents;

a plurality of cooling fins arranged within the air duct; and a plurality of heat pipes, each of the plurality of heat pipes having a first end in thermal contact with one of the plurality of cooling fins, and a second end in thermal contact with an integrated circuit within the computing device housing.

15. The heat rejection system as recited in claim 14, wherein a cooling fin of the plurality of cooling fins is in direct contact with an outlet vent of the plurality of outlet vents, and wherein the cooling fin comprises a plurality of curved cooling fin that splits the air into the two separate streams.

16. The heat rejection system as recited in claim 15, wherein the computing device housing is substantially tapered along a peripheral portion of the computing device housing, and wherein the bottom surface is separate from the rear surface.

17. The heat rejection system as recited in claim 16, wherein the fan coupled with the air duct splits incoming air into two separate paths causing a circular flow of air within the computing device housing.

* * * * *